United States Patent [19]

Yamauchi

[11] 4,392,874
[45] Jul. 12, 1983

[54] DEGASSIFYING AND MIXING APPARATUS FOR LIQUIDS

[75] Inventor: Samuel T. Yamauchi, Fountain Valley, Calif.

[73] Assignee: The United States of America as represented by the Administrator of the National Aeronautics and Space Administration, Washington, D.C.

[21] Appl. No.: 325,082

[22] Filed: Nov. 25, 1981

[51] Int. Cl.³ .............................................. B01D 19/00
[52] U.S. Cl. .......................................... 55/194; 55/202
[58] Field of Search .................. 55/39, 41, 52, 55, 182, 55/189-194, 201, 202

[56] References Cited

U.S. PATENT DOCUMENTS

| | | | |
|---|---|---|---|
| 1,511,876 | 10/1924 | Ehrhart | 55/194 X |
| 1,895,983 | 1/1933 | Emanueli | 55/194 |
| 2,060,242 | 11/1936 | Pulley | 55/190 |
| 2,285,973 | 6/1942 | Hopkins | 55/191 X |
| 2,507,797 | 5/1950 | Martin | 55/190 X |
| 2,540,390 | 2/1951 | Gorgerat et al. | 55/192 |
| 2,668,598 | 2/1954 | Seed | 55/192 |
| 4,062,661 | 12/1977 | Wiemer et al. | 55/190 |

FOREIGN PATENT DOCUMENTS 1034675  6/1966  United Kingdom .................. 55/194

Primary Examiner—Robert H. Spitzer
Attorney, Agent, or Firm—Russell E. Schlorff; John R. Manning; Marvin F. Matthews

[57] ABSTRACT

A liquid degassifier including a containment vessel (10), a liquid pump (16) and a header assembly (12) within the containment vessel (10) in a volume above the reservoir (11a) of liquid therein. The pump (16) draws from this reservoir and outputs to the header assembly, the latter being constructed to return the liquid to the reservoir in the form of a stacked plurality of vertically spaced, concentric, conical cascades (13a, 14a and 15a) via orifices (13, 14, and 15).

A vacuum source (34) provides a partial vacuum in the containment vessel (10) to enhance the degassing process.

6 Claims, 2 Drawing Figures

DEGASSIFYING AND MIXING APPARATUS FOR LIQUIDS

ORIGIN OF THE INVENTION

The invention described herein was made in the performance of work under a NASA contract and is subject to the provisions of Section 305 of the National Aeronautics and Space Act of 1958, Public Law 85-568 (72 STAT. 435; U.S.C. 2457).

TECHNICAL FIELD

The invention relates generally to liquid degassifiers also adapted for liquid mixing, and more specifically to degassifiers for potable water which employ vacuum degassification.

In the arts relating to spacecraft, the need for degassing of liquids, such as the potable water supply, is frequently encountered. Other fields of utilization include hydraulic systems for aircraft and heavy machinery and in the field of heat transfer devices, where maximum heat transfer is required.

BACKGROUND ART

The need for degassification of liquids is encountered in the above-mentioned applications and others which will be recognized by those of skill in the corresponding arts. An application for which the present invention is especially useful is the degassification of potable water for use on a spacecraft.

Prior art liquid degassifiers all provide some form of liquid particle or film break-up to increase liquid surface subject to degassification. The prior art apparatus for the accomplishment of that filming or particlizing has usually been bulky because of tray and baffle use. Also, such prior art apparatus occupies a large fraction of the container tank volume.

Finally, motor drives have been used in some prior art devices (in addition to the usual pump).

The general concept of degassing a liquid or liquid mixture in a partial vacuum is disclosed in U.S. Pat. Nos. 3,517,487 and 3,555,819 (Burnham) as well as in U.S. Pat. No. 2,714,938 (Smith) and various other references, and can be considered known per se.

U.S. Pat. No. 4,007,022, (Schleicher et al.) deaerates a dispersion of PVC in water while Burnham is concerned with deaeration of drilling mud, both more viscous ixtures, than water or the like as so advantageously handled by the invention.

U.S. Pat. No. 2,071,393 (Doherty) concerns deaeration of a relatively viscous mixture, to wit: catsup. A motor drive appears to provide a type of centrifuging action by means of a driven beater arrangement. U.S. Pat. No. 2,041,059 (French), applies teachings very similar to those of Smith to the degassing of milk or cream during pasteurization. U.S. Pat. Nos. 3,358,425 and 4,210,176 (Rodman et al.) accomplish a very similar result for oil purification employing rotating disks for fluid filming.

U.S. Pat. No. 2,064,650 (Emanueli) degasses liquids, particularly oil, by spreading the liquid over a filming structure by centrifugal force (a motor-driven structure).

U.S. Pat. No. 2,020,250 (Stephens) concerns food processing by deaeration to remove odors generated by prior ultra-violet irradiation. Vanes for generating a deaerating surface are provided, the material being processed as it passes over surfaces in a partially evacuated vessel.

In U.S. Pat. No. 1,836,338 (Rodman et al.), spraying of a liquid vertically upward into a partially evacuated vessel is employed for degassing.

Causing a liquid (i.e., oil) to flow in a thin layer over an elongated path at less than atmospheric pressure for degassing and water vapor removal appears to be the essence of the U.S. Pat. No. 3,789,579 (El Hindi).

The special problem of degassification of a high viscosity liquid (e.g., viscose) in a vacuum tank as the liquid passes over baffles intended to cause a filming action, is described in Elliott et al. U.S. Pat. No. 3,368,330.

U.S. Pat. No. 3,325,974 (Griffin), provides the basic function of drilling mud degassing at sub-atmospheric pressure by passing the mud over baffle surfaces as in Burnham patents aforementioned.

U.S. Pat. No. 1,598,787 (Shields) degasses water and soft drinks, etc., to increase affinity for desolving $CO_2$ for carbonation. A series of "pans" provides for breaking up the liquid in the vacuum chamber.

U.S. Pat. No. 1,457,153 (Elliott), degasses steam boiler feed water in a vacuum vessel relying on the "violent ebullition of flashing action" during injection into the vessel.

U.S. Pat. No. 2,540,390 (Gorgerat et al.) and Canadian Pat. No. 653,008 (Anderson) are further examples of spray methods for increasing the liquid degassing surface, by gravity liquid fall and force nozzle over a guiding core, respectively.

Other drilling mud degassers are disclosed in U.S. Pat. Nos. 3,831,352 (Parcels) and 3,358,425 and 3,481,113, Parcels having a break-up impeller and all comprising baffle structures in a vacuum vessel.

Canadian Pat. No. 653,008 (Anderson) undertakes to constrain the filming aperture of the liquid between concentric conical surfaces, but thereafter permits liquid flow over one conical surface such that the liquid is exposed to the vacuum environment on one surface only.

U.S. Pat. No. 2,979,156 (Sebald), appears to employ liquid spray degassing in a vacuum vessel with particular attention to pressure equalization to minimize the vacuum pumping effort required.

Most of the foregoing prior art references include flow-path baffle or tray arrangements for increasing the liquid or mixture exposed surface in a vacuum vessel, except where conventional spray apparatus is employed. The prior art does not appear to include the concept of cascading the liquid in thim films within a vacuum vessel free of any filming baffle or other guiding structure.

It will be seen that truly thin film liquid formations for optimum degassing efficiency are not provided in the prior art. Moreover, wherever a liquid flow over a surface is relied upon to obtain a liquid film, only one surface of the film is exposed to degassification force (vacuum, for example).

Liquid sprays do not provide sufficiently high liquid surface exposure for optimum degassification, and "mud" or other liquid/solid mixtures are obviously not degassable in analogous structures and by analogous methods vis-a-vis, the degassification of water and other liquids of relatively low viscosity.

The manner in which the invention deals with the disadvantages and inadequacies of the prior art will be understood as this specification proceeds.

DISCLOSURE OF THE INVENTION

The invention provides a unique apparatus which breaks the liquid into a plurality on conical, thin-film, unguided cascades, both surfaces of which are exposed to the degassing environment. That environment is preferably a partial vacuum. Normally the stacked conical cascades would be pump driven and the degree of evacuation of the surrounding space is kept above the vapor pressure of the liquid to preclude fluid loss during operation. Chilling of the liquid is known to lower vapor pressure, of course.

In general, the thinner a liquid film can be made, the larger the degassification (deaeration) rate. The present invention greatly improves on prior art devices in that regard. The structure of the invention can provide more fluid exposure at lower liquid pressure (2.5 to 7.5 psig) than any other known commercial device for the purpose.

At 8.0 to 18 psig liquid pumping pressure, the deaerator of the invention doubles its liquid exposure area. The circumferential fluid spread prevents local stratification and affords fluid mixing capability both within the liquid films as well as by mechanical action as the spray strikes the reservoir of liquid in the containment vessel.

The high efficiency of degassification achieved by the invention translates into smaller and lighter, as well as less expensive equipment. The relatively simple structure of the invention will also be appreciated.

The term degassification is the more general term, however the interchangeable term deaeration describes the usual process in that it is most often that the gas to be removed is air.

A detailed description of a typical device according to the invention follows.

BEST MODE OF CARRYING OUT THE INVENTION

Figure 1:
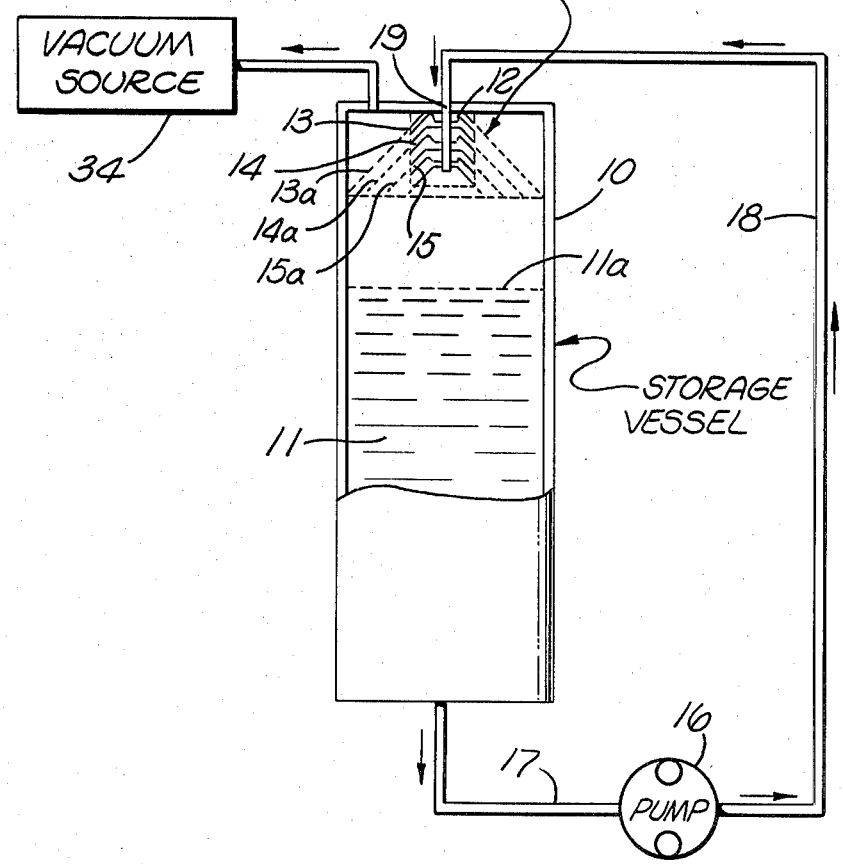
FIG. 1 is a mechanical schematic of a typical combination comprising the degassification/mixer of the invention.

Referring now to FIG. 1, the overall combination of the invention will be seen. Although the advantages of the novel filming technique of the invention apply whether or not the containment vessel is evacuated, the combination with vacuum degassification environment is much more efficient and will be described in the preferred combination.

In FIG. 1 the storage vessel 10 is a vacuum-tight container or tank. Liquid 11 has an arbitrary level 11a which must always be below the lower extremity of the header assembly 12.

The header assembly 12 is shown having three downward directed circumferential orifices 13, 14 and 15, producing corresponding conical liquid film cascades 13a, 14a and 15a. It is to be understood, however, that these three cascades constitute a design decision and within the inventive concept, more or fewer orifices and corresponding conical liquid film cascades can be provided. The resulting degassing rates are roughly proportional to the number of such cascades (other parameters, such as liquid pumping pressure and degree of vacuum being the same).

The pump 16 performs the function, entirely conventional per se, of circulating liquid from the reservoir of liquid 11 via pipes of tubes 17 and 18, and vacuum source 34 may be a conventional pump or the like.

Deaeration in the apparatus of FIG. 1 can be regarded as a batch or continuous process, however, fill and tap valves have not been shown since these are well known per se.

As previously indicated, the header assembly 12 is a generally cylindrical body with its axis running vertically as depicted in FIG. 1. The orifices are essentially circular rings projecting as circular bands about the circumference of this cylindrical body. Central to the header body and extending from input 19 is a passage which communicates with the passages leading to the orifices. This structure will be more fully understood from FIG. 2.

Figure 2:
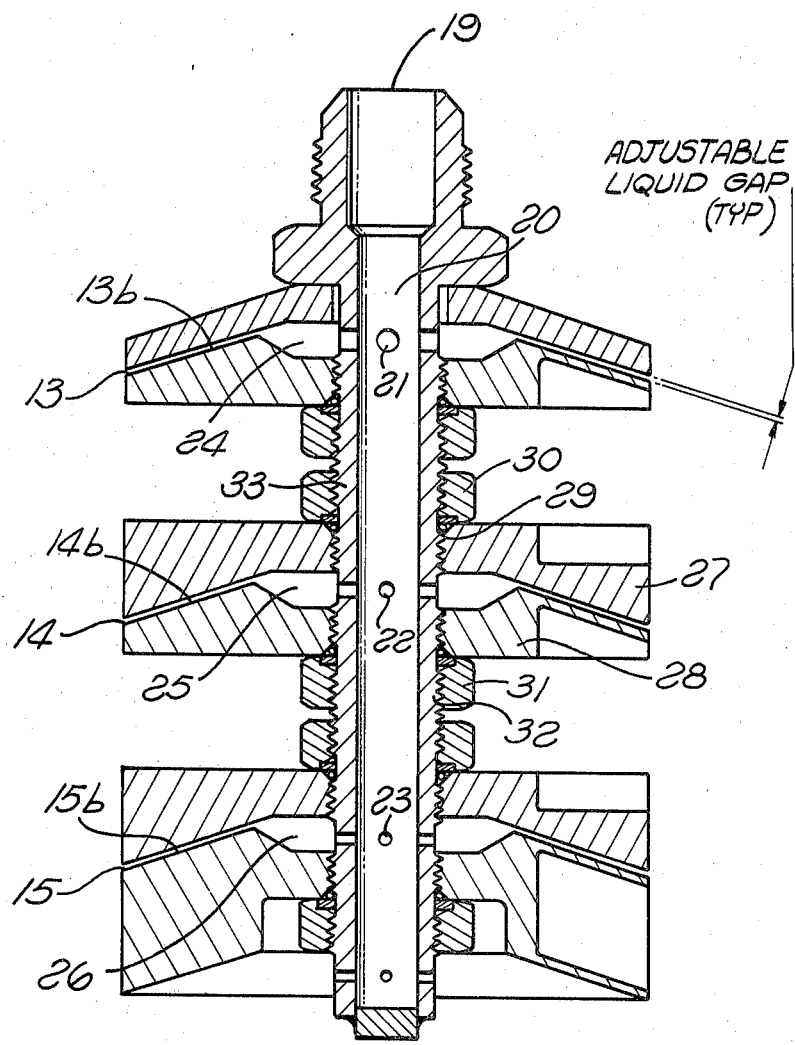
FIG. 2 is an axially taken cross-section of the header assembly of FIG. 1.

Referring now to FIG. 2, the orifices 13, 14 and 15 can be identified. Although FIG. 2 indicates that the body of the header assembly is not uniformly cylindrical, it is spoken of as being generally cylindrical because of the cylindrical outer envelope into which it would fit. From input 19 the manifold comprises the bore on passage 20 having lateral openings 21, 22 and 23 communicating with the annular passages 13b, 14b and 15b, the latter ending in corresponding circumferential orifices 13, 14 and 15. Axially enlarged portions of 13b, 14b and 15b, comprising 24, 25 and 26 respectively, may be thought of as acting as part of the manifold or liquid plenum.

The lateral openings 21, 22 and 23 will be seen to be progressively smaller from top to bottom, this helping to provide separation of the conical cascades falling through the evacuated volume into the reservoir.

In one embodiment of the invention, the orifices 21, 22 and 23 were sized for a specific total system flow rate of 3.75 gallons per minute. The flow was divided so that more liquid would flow through the top orifices than the bottom, providing maximum quantity at the outer periphery. The other smaller holes were sized to provide enough cascading for filming as well as flow distribution for mixing of other fluids. Alternatively, all orifices could be made the same size with adjustments being made by controlling the liquid gap. However, the arrangement illustrated reduces flow adjustment to a minimum.

The orifices 13, 14 and 15 may be adjustable on presettable based on the desired cascade film thickness emitted. For that purpose, one typical possible adjustment structure for adjusting the orifice liquid gaps is provided by the relative axial positioning of body parts 27 and 28 (for example) by means of captive adjustment nuts such as 30 and 31 engaging a threaded portion of the body tube member 33 at 32, for example seal members 29 may be inserted between the body parts and their captive nuts for sealing between sprays. Other conventional mechanical expedients are, of course, available to the skilled artisan for accomplishing the same objective. Orifices 13 and 15 can be similarly adjusted by equivalent structure identifiable on FIG. 2.

Materials and fabrication methods are all entirely conventional. Metals and certain well known plastic materials can be suitable for the header assembly. The same is true of the containment vessel and the other elements of FIGS. 1 and 2.

Where corrosive materials are to be degassed, suitably resistant materials must be used.

Variations and modifications are obviously possible as a matter of ordinary skill once the principles of the invention are appreciated. Accordingly, it it not intended that the scope of the invention should be regarded as limited to the specific embodiment shown and described.

I claim:

1. Liquid degassifying apparatus comprising: a vacuum tight vessel for containment of liquid to be subjected to continuous degassing operations, the level of said liquid within said vessel producing a first liquid volume therein, the remainder of the volume of said vessel comprising a second volume; a header assembly within said second volume, said header assembly including a stacked, spaced plurality of axially narrow orifices, each of said orifices extending generally circumferentially about the axis of said header assembly to produce a plurality of cascades of spaced generally concentric, conical, liquid films into said first volume and means for adjusting the thickness of the liquid films; a first means including a liquid input and manifold for said header assembly, said manifold being formed of a generally cylindrical body having a generally axial cavity therein, and a liquid passage connecting each of said orifices to said liquid manifold; a second means for circulating said liquid from said first volume to said header assembly liquid input; and a third means for partially evacuating said second volume.

2. Apparatus according to claim 1 in which the liquid passages are progressively smaller from top to bottom.

3. Apparatus according to claim 2 in which the opening of the orifices are adjustable.

4. Apparatus according to claim 3 in which the cylindrical body has male threads on its outer surface and each orifice is defined by a pair of members having female threads engaging with the male threads whereby the thickness of each orifices may be adjusted.

5. Apparatus according to claim 4 in which there is a smaller liquid passage below the orifice to form with the lower member of the bottom orifice a further conical spray.

6. Apparatus according to claim 1 in which the opening of the orifices are adjustable.

* * * * *